United States Patent
Yamashita et al.

(10) Patent No.: US 9,479,423 B2
(45) Date of Patent: Oct. 25, 2016

(54) INFORMATION PROCESSING SYSTEM, RELAY DEVICE, INFORMATION PROCESSING DEVICE, AND INFORMATION PROCESSING METHOD

(71) Applicant: FUJITSU LIMITED, Kawasaki-shi, Kanagawa (JP)

(72) Inventors: Shinji Yamashita, Kawasaki (JP); Toshihiko Kurita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 260 days.

(21) Appl. No.: 13/901,661

(22) Filed: May 24, 2013

(65) Prior Publication Data
US 2013/0343396 A1 Dec. 26, 2013

(30) Foreign Application Priority Data
Jun. 22, 2012 (JP) .................................. 2012-141315

(51) Int. Cl.
 H04L 12/721 (2013.01)
 H04L 12/729 (2013.01)
 H04L 12/707 (2013.01)

(52) U.S. Cl.
 CPC ........... *H04L 45/124* (2013.01); *H04L 45/125* (2013.01); *H04L 45/22* (2013.01)

(58) Field of Classification Search
None
See application file for complete search history.

(56) References Cited

U.S. PATENT DOCUMENTS

| | | | |
|---|---|---|---|
| 6,738,352 B1 | 5/2004 | Yamada et al. | |
| 8,451,842 B2 * | 5/2013 | Mack-Crane et al. | 370/392 |
| 2001/0037401 A1 * | 11/2001 | Soumiya et al. | 709/232 |
| 2004/0049595 A1 * | 3/2004 | Sun | H04L 45/00 709/238 |
| 2004/0193729 A1 * | 9/2004 | Saraph | 709/241 |
| 2006/0126503 A1 * | 6/2006 | Huck et al. | 370/225 |
| 2006/0187829 A1 * | 8/2006 | Heiner et al. | 370/229 |
| 2006/0253607 A1 * | 11/2006 | Schollmeier et al. | 709/241 |
| 2008/0084856 A1 * | 4/2008 | Ramachandran | 370/342 |
| 2009/0022070 A1 * | 1/2009 | Iovanna et al. | 370/256 |
| 2010/0195560 A1 * | 8/2010 | Nozaki et al. | 370/315 |
| 2011/0205898 A1 * | 8/2011 | Ichiki et al. | 370/235 |
| 2012/0030150 A1 * | 2/2012 | McAuley | H04L 45/02 706/12 |
| 2013/0060929 A1 * | 3/2013 | Koponen et al. | 709/224 |
| 2013/0242745 A1 * | 9/2013 | Umezuki | 370/236 |

FOREIGN PATENT DOCUMENTS

JP 2000-253058 9/2000

* cited by examiner

*Primary Examiner* — Anh-Vu Ly
*Assistant Examiner* — Roberta A Shand
(74) *Attorney, Agent, or Firm* — Staas & Halsey LLP

(57) ABSTRACT

An information processing system includes a plurality of computers, a plurality of relay devices having a memory which stores a first parameter combination for selecting a first transfer path from a plurality of paths for coupling to each of the plurality of computers, and a management computer which stores, in the memory, a second parameter combination for selecting a second transfer path from the plurality of paths when a traffic of any one of couplings for coupling each of the plurality of relay devices exceeds a given amount, wherein the plurality of relay devices set a transfer destination of received data by selecting information corresponding to computer combination information included in the received data from any one of the first parameter combination and the second parameter combination.

14 Claims, 22 Drawing Sheets

FIG. 5

| LINK ID | ROUTING BRIDGES AT BOTH EDGES OF LINK | | LINK COST |
|---|---|---|---|
| LK1 | RB1 | RB4 | 100 |
| LK2 | RB1 | RB5 | 100 |
| LK3 | RB1 | RB6 | 100 |
| LK4 | RB2 | RB4 | 100 |
| LK5 | RB2 | RB5 | 100 |
| LK6 | RB2 | RB6 | 100 |
| LK7 | RB3 | RB4 | 100 |
| LK8 | RB3 | RB5 | 100 |
| LK9 | RB3 | RB6 | 100 |

FIG. 6

| PATH ID | LINK INCLUDED IN PATH | | TOTAL LINK COST |
|---|---|---|---|
| P1 | LK1 | LK4 | 200 |
| P2 | LK1 | LK7 | 200 |
| P3 | LK2 | LK5 | 200 |
| P4 | LK2 | LK8 | 200 |
| P5 | LK3 | LK6 | 200 |
| P6 | LK3 | LK9 | 200 |
| P7 | LK4 | LK7 | 200 |
| P8 | LK5 | LK8 | 200 |
| P9 | LK6 | LK9 | 200 |

FIG. 14

| FLOW ID | TRAFFIC AMOUNT | COMBINATION OF VIRTUAL MACHINES | | INGRESS / EGRESS | | PATH ID | LINK INCLUDED IN PATH | |
|---|---|---|---|---|---|---|---|---|
| F1 | 4Gbps | VM11 | VM15 | RB1 | RB3 | P2 | LK1 | LK7 |
| F2 | 7Gbps | VM12 | VM16 | RB1 | RB3 | P4 | LK2 | LK8 |
| F3 | 2Gbps | VM13 | VM17 | RB1 | RB3 | P6 | LK3 | LK9 |
| F4 | 2Gbps | VM14 | VM18 | RB2 | RB3 | P8 | LK5 | LK8 |

FIG. 15

| FLOW ID | TRAFFIC AMOUNT | COMBINATION OF VIRTUAL MACHINES | | INGRESS / EGRESS | | PATH ID | LINK INCLUDED IN PATH | |
|---|---|---|---|---|---|---|---|---|
| F1 | 4Gbps | VM11 | VM15 | RB1 | RB3 | P2 | LK1 | LK7 |
| F2 | 7Gbps | VM12 | VM16 | RB1 | RB3 | P4 | LK2 | LK8 |
| F3 | 2Gbps | VM13 | VM17 | RB1 | RB3 | P6 | LK3 | LK9 |
| F4 | 9Gbps | VM14 | VM18 | RB2 | RB3 | P8 | LK5 | LK8 |

FIG. 16

| LINK ID | FLOW ID | TRAFFIC AMOUNT |
|---|---|---|
| LK1 | F1 | 4Gbps |
| LK2 | F2 | 7Gbps |
| LK3 | F3 | 2Gbps |
| LK4 | – | – |
| LK5 | F4 | 9Gbps |
| LK6 | – | – |
| LK7 | F1 | 4Gbps |
| LK8 | F2,F4 | 10Gbps (CONGESTION) |
| LK9 | F3 | 2Gbps |

FIG. 17

| PATH ID | LINK INCLUDED IN PATH | | TOTAL LINK COST CORRESPONDING TO F2 |
|---|---|---|---|
| P1 | LK1 | LK4 | 200 |
| P2 | LK1 | LK7 | 200 |
| P3 | LK2 | LK5 | 200 |
| P4 | LK2 | LK8 | 200 |
| P5 | LK3 | LK6 | 150 |
| P6 | LK3 | LK9 | 100 |
| P7 | LK4 | LK7 | 200 |
| P8 | LK5 | LK8 | 200 |
| P9 | LK6 | LK9 | 150 |

FIG. 18

| PATH ID | LINK INCLUDED IN PATH | | TOTAL LINK COST |
|---|---|---|---|
| P1 | LK1 | LK4 | 150 |
| P2 | LK1 | LK7 | 150 |
| P3 | LK2 | LK5 | 200 |
| P4 | LK2 | LK8 | 200 |
| P5 | LK3 | LK6 | 150 |
| P6 | LK3 | LK9 | 100 |
| P7 | LK4 | LK7 | 150 |
| P8 | LK5 | LK8 | 200 |
| P9 | LK6 | LK9 | 200 |

FIG. 21

| FLOW ID | COMBINATION OF VIRTUAL MACHINES | | TRAFFIC AMOUNT | INGRESS / EGRESS | | PATH ID | LINK INCLUDED IN PATH | |
|---|---|---|---|---|---|---|---|---|
| F1 | VM11 | VM15 | 4Gbps | RB1 | RB3 | P2 | LK1 | LK7 |
| F2 | VM12 | VM16 | 7Gbps | RB1 | RB3 | P6 | LK2 | LK8 |
| F3 | VM13 | VM17 | 2Gbps | RB1 | RB3 | P6 | LK3 | LK9 |
| F4 | VM14 | VM18 | 2Gbps | RB2 | RB3 | P8 | LK5 | LK8 |

FIG. 22

| LINK ID | FLOW ID | TRAFFIC AMOUNT |
|---------|---------|----------------|
| LK1 | F1 | 4Gbps |
| LK2 | F2 | 7Gbps |
| LK3 | F2,F3 | 9Gbps |
| LK4 | – | – |
| LK5 | F4 | 9Gbps |
| LK6 | – | – |
| LK7 | F1 | 4Gbps |
| LK8 | F4 | 9Gbps |
| LK9 | F2,F3 | 9Gbps |

INFORMATION PROCESSING SYSTEM, RELAY DEVICE, INFORMATION PROCESSING DEVICE, AND INFORMATION PROCESSING METHOD

CROSS-REFERENCE TO RELATED APPLICATIONS

This application is based upon and claims the benefit of priority from the prior Japanese Patent Application No. 2012-141315 filed on Jun. 22, 2012, the entire contents of which are incorporated herein by reference.

FIELD

The embodiments discussed herein are related to an information processing system, a relay device, an information processing device, and an information processing method.

BACKGROUND

Spanning Tree Protocol (STP), which is applied to a Layer 2 (L2) network coupling servers in a data center, is a technique for preventing a loop from being formed in the L2 network by setting a blocking port in a relay device in the network. However, part of use of a path in the network is limited when the blocking port is set. Thus, a network band is not efficiently used.

As the traffic in a data center network has increased in recent years, international standardization of a multipath technique that is applied to the L2 network has progressed so that the network band is efficiently used. TRansParent Interconnection of Lots of Links (TRILL), which is one of the multipath techniques, has been proposed to prevent a loop from being formed in the L2 network coupling the servers.

FIG. 1 illustrates an example of an information processing system to which the TRILL is applied. The example of the information processing system includes a network that has six routing bridges and four servers coupled to the network. In FIG. 1, an RB indicates a routing bridge, and an SV indicates a server. Among the six routing bridges, a routing bridge which is coupled to an external device (for example, a server SV) of the network may be referred to as an edge routing bridge. The coupling between the routing bridges is referred to as a link. A parameter called a link cost is set to the link. The coupling between the edge routing bridges is referred to as a path. The total value of the link cost that is set to the link included in the path is defined as the total link cost. When the six routing bridges are coupled to each other, a plurality of paths is formed. The path of which the total link cost is the smallest is selected if there is more than one path that is selectable to be used for transfer between the servers. If there is more than one path having the smallest total link cost, a load of the network is dispersed when an algorithm for selecting the paths at the same ratio is applied.

There is known a technique of a relay device in the network for collecting flows of an IP datagram and distributing transfer destinations by the collected unit.

[Patent Document] Japanese Laid-open Patent Publication No. 2000-253058

SUMMARY

According to an aspect of the invention, an information processing system includes a plurality of computers, a plurality of relay devices having a memory which stores a first parameter combination for selecting a first transfer path from a plurality of paths for coupling to each of the plurality of computers, and a management computer which stores, in the memory, a second parameter combination for selecting a second transfer path from the plurality of paths when a traffic of any one of couplings for coupling each of the plurality of relay devices exceeds a given amount, wherein the plurality of relay devices set a transfer destination of received data by selecting information corresponding to computer combination information included in the received data from any one of the first parameter combination and the second parameter combination.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 illustrates part of cost information of a network according to the embodiments;

FIG. 6 illustrates another part of the cost information of the network according to the embodiments;

FIG. 14 illustrates traffic information in a case where no congestion exists in the network according to the embodiments;

FIG. 15 illustrates the traffic information in a case where congestion exists in the network according to the embodiments;

FIG. 16 illustrates a congestion state of the network according to the embodiments;

FIG. 17 illustrates the cost information that is changed in the network according to the embodiments;

FIG. 18 illustrates the changed cost information;

FIG. 21 illustrates another piece of traffic information in a case where no congestion exists in the network according to the embodiments; and FIG. 22 illustrates a traffic state of the network according to the embodiments.

DESCRIPTION OF THE EMBODIMENTS

Figure 1:
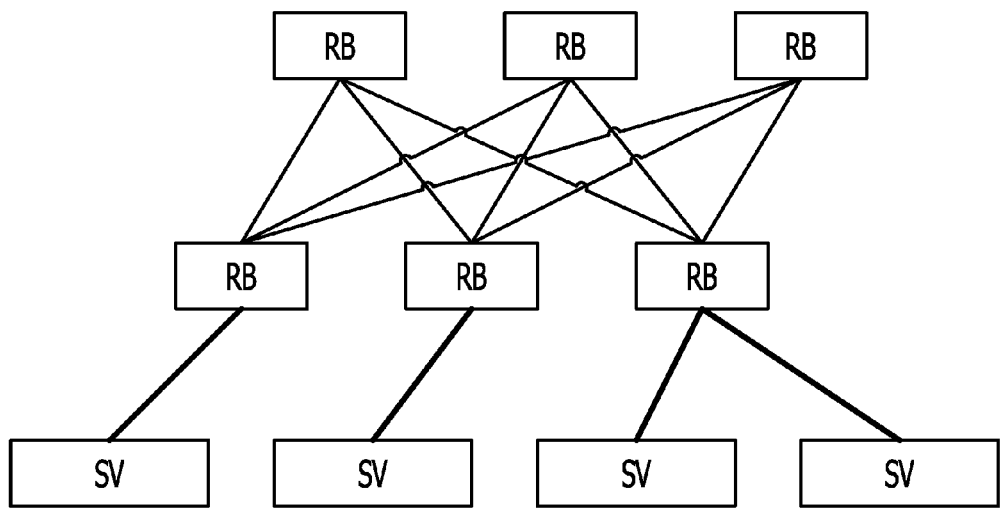
FIG. 1 illustrates an example of an information processing system to which a prior art is applied.
Figure 2:
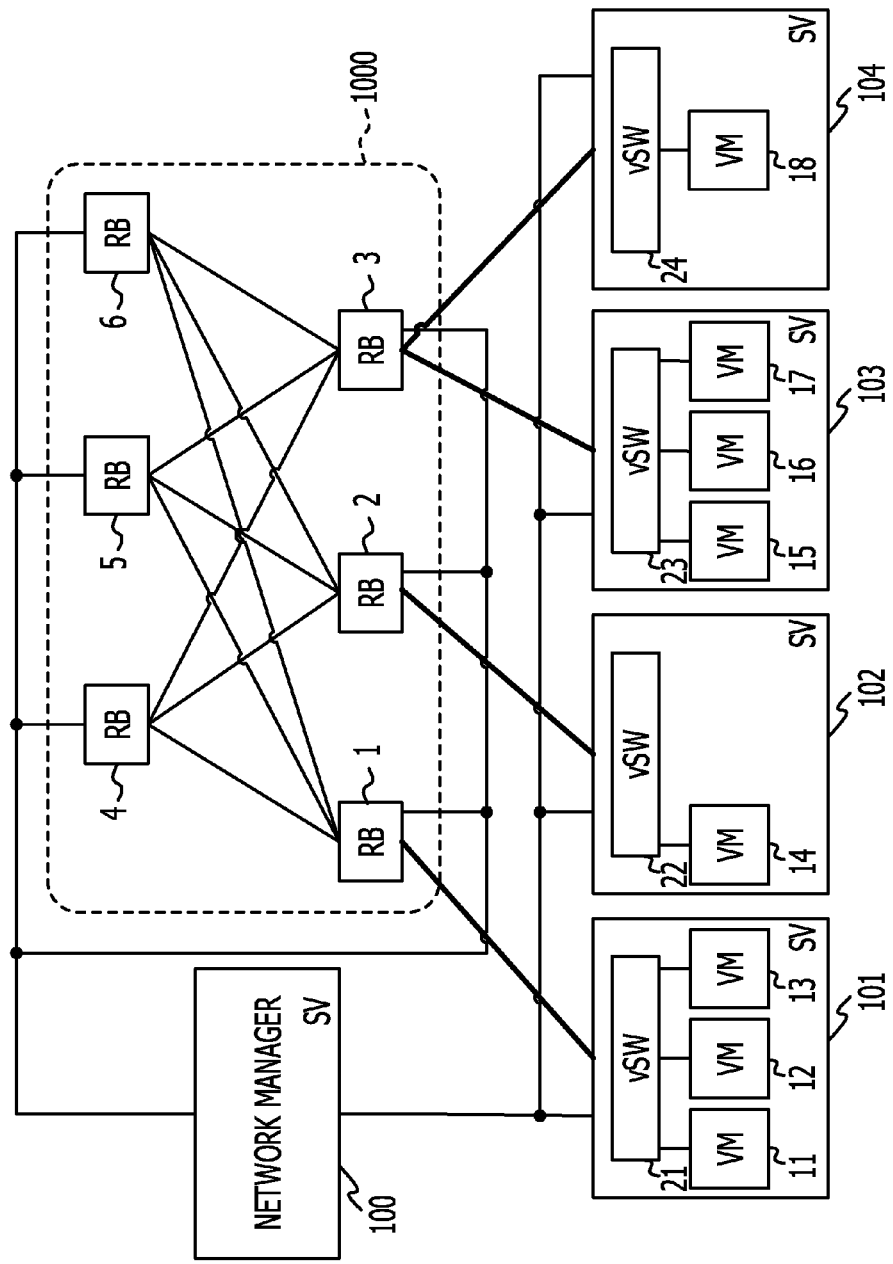
FIG. 2 illustrates an information processing system according to embodiments.

FIG. 2 illustrates an information processing system according to embodiments. The information processing system includes a network 1000 and servers 100 to 104 (computers 100 to 104). The network 1000 includes routing bridges 1 to 6. The routing bridges 1 to 6 are relay devices that switch paths of data transfer among the servers 101 to 104. In FIG. 2, an SV indicates a server, and an RB indicates a routing bridge. Further, in FIG. 2, a VM indicates a virtual machine that is described below, and a vSW indicates a virtual switch that is described below.

The routing bridge 1 is coupled to the routing bridges 4 to 6. The routing bridge 1 is coupled to the server 101. In the server 101, virtual machines 11 to 13 and a virtual switch 21 perform. The virtual machines 11 to 13 transfer data to the routing bridge 1 through the virtual switch 21. The routing bridge 2 is coupled to the routing bridges 4 to 6. The routing bridge 2 is coupled to the server 102. In the server 102, a virtual machine 14 and a virtual switch 22 perform. The virtual machine 14 transfers the data to the routing bridge 2 through the virtual switch 22. The routing bridge 3 is coupled to the routing bridges 4 to 6. The routing bridge 3 is coupled to the server 103 and the server 104. In the server 103, virtual machines 15 to 17 and a virtual switch 23 perform. The virtual machines 15 to 17 transfer the data to the routing bridge 3 through the virtual switch 23. In the server 104, a virtual machine 18 and a virtual switch 24 perform. The virtual machine 18 transfers the data to the routing bridge 3 through the virtual switch 24.

The coupling between the routing bridges is called a link and added with a link ID. A parameter called a link cost is set to the link.

Among the routing bridges 1 to 6, a routing bridge which is coupled to an external device (for example, the servers 101 to 104) out of the network 1000 may be referred to as an edge routing bridge. In the network 1000, the routing bridge 1, the routing bridge 2, and the routing bridge 3 are edge routing bridges. The coupling between the edge routing bridges is referred to as a path and added with a path ID. The path may include a plurality of links, and the total value of the link cost of all the links included in the path is set to the path as a parameter called a total link cost. When the respective routing bridges 1 to 6 are coupled to each other as relay devices in the network 1000, a plurality of paths is formed among the servers 101 to 104 (the computers 101 to 104). By comparing the values of the total link cost set to the respective paths, a path is determined to be selected as the path of data transfer of the servers 101 to 104 (the computers 101 to 104). For example, the path of which the value of the total link cost is small may be selected as the path of data transfer.

Figure 3:
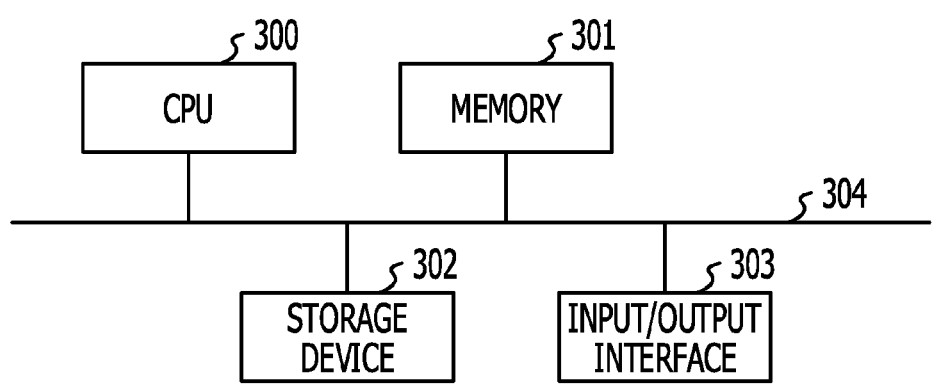
FIG. 3 illustrates a hardware configuration of a routing bridge (a relay device) according to the embodiments.

FIG. 3 illustrates a hardware configuration of a routing bridge (a relay device) according to the embodiments. Each of the routing bridges 1 to 6 is a computer that includes a CPU 300, a memory 301, a storage device 302, an input/output interface 303, and a bus 304. The CPU 300, the memory 301, the storage device 302, and the input/output interface 303 are coupled to the bus 304. The CPU 300 includes one or more processors to perform processing. The memory 301 is a RAM, for example. The storage device 302 is, for example, a non-volatile memory such as a ROM and a flash memory or a magnetic disk device such as a Hard Disk Drive (HDD). The input/output interface 303 is an interface that inputs and outputs data to and from an external device.

Figure 19:
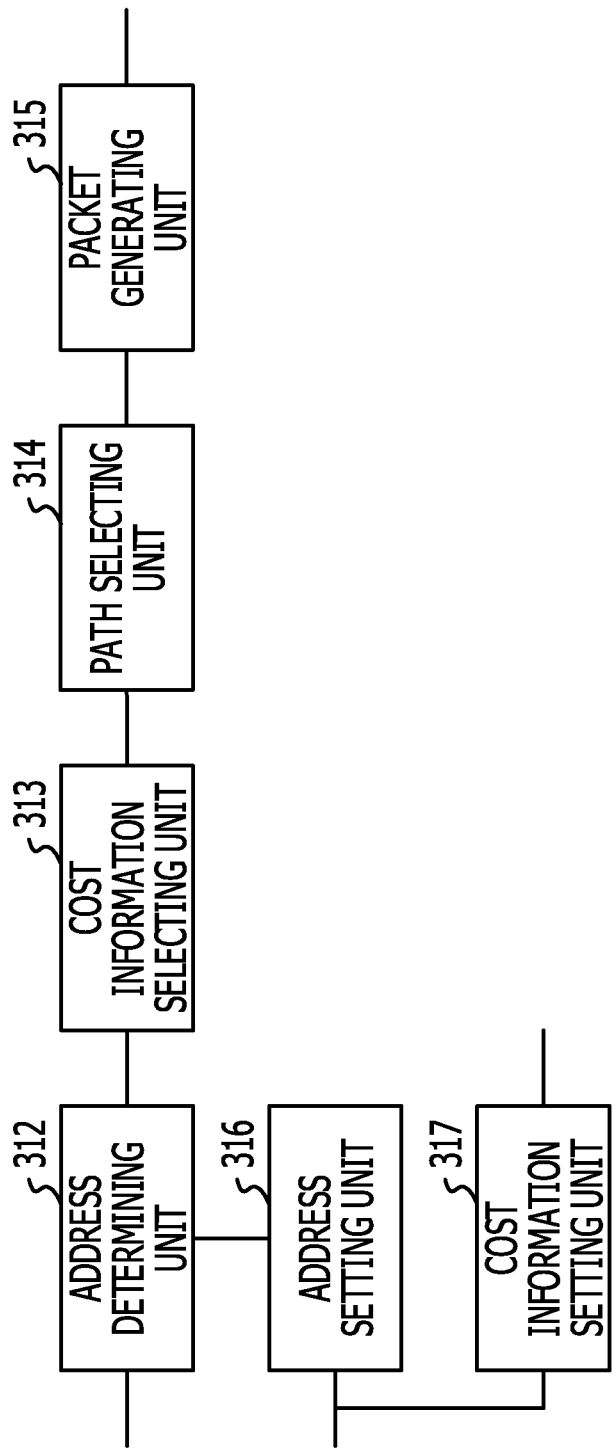
FIG. 19 illustrates other function blocks of the routing bridge (the relay device) according to the embodiments.
Figure 20:
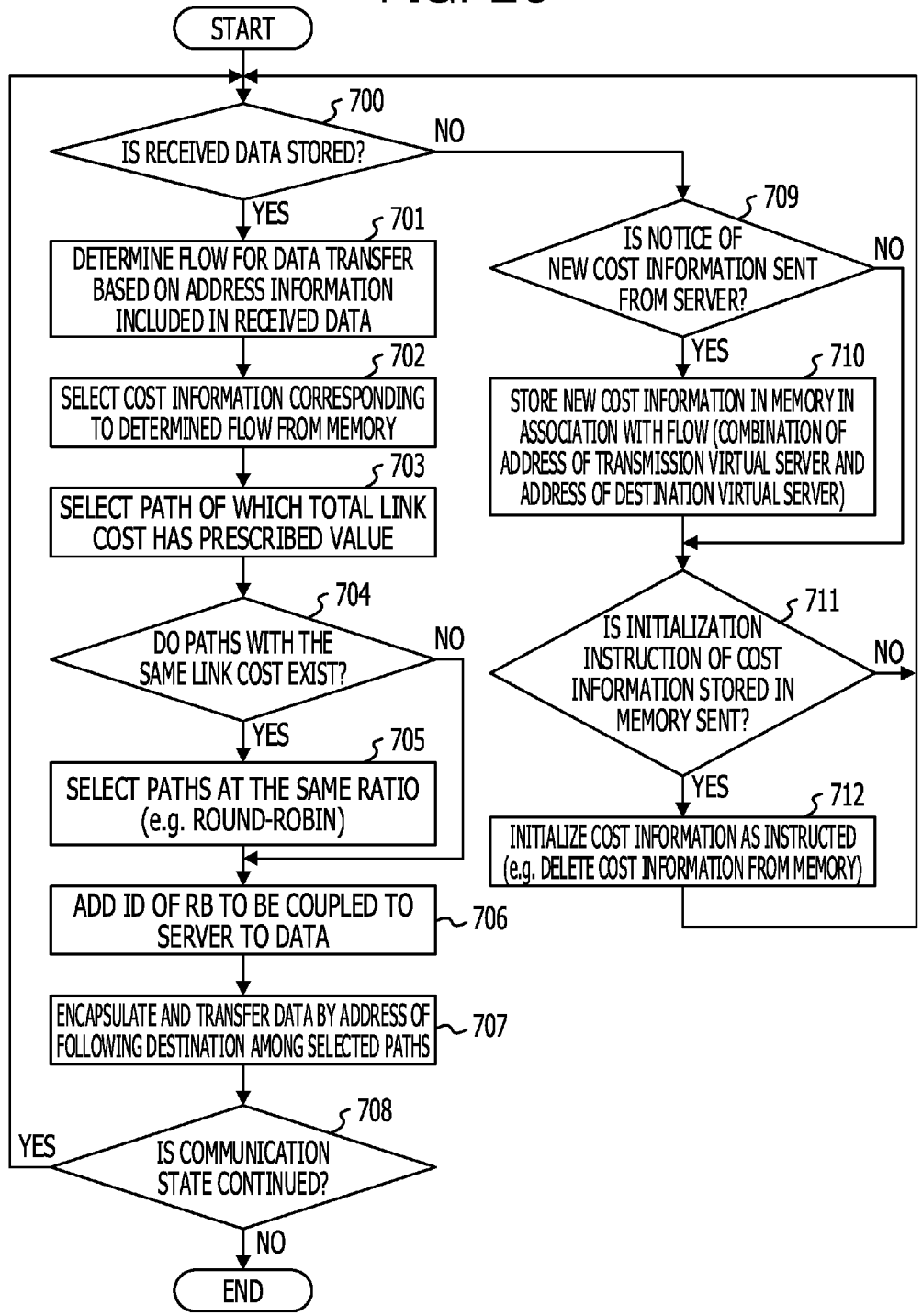
FIG. 20 illustrates the processing performed by the routing bridge (the relay device) according to the embodiments.

The memory 301 stores a program in which processing for controlling operations of the routing bridges 1 to 6 is written and a program in which the processing illustrated in FIG. 20 is written. The operations of the routing bridges 1 to 6 are controlled when the CPU 300 executes the program stored in the memory 301, so that the routing bridges 1 to 6 function as the function blocks illustrated in FIG. 4 and FIG. 19.

Figure 4:
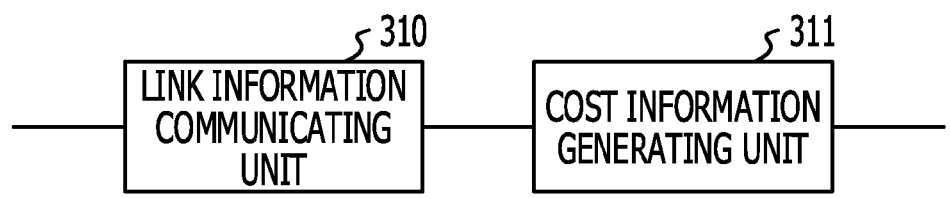
FIG. 4 illustrates function blocks performed by the routing bridge according to the embodiments.

FIG. 4 illustrates function blocks performed by the routing bridge (the relay device) according to the embodiments. The routing bridges 1 to 6 function as a link information communicating unit 310 and a cost information generating unit 311 when the CPU 300 performs the processing written in the program stored in the memory 301. The routing bridges 1 to 6 previously stores, in the memory 301, the link ID and the link cost of the link that is coupled to each of the routing bridges 1 to 6. The link ID is associated with the IDs of the routing bridge at both edges of the link. By detecting the server and the virtual machine coupled to each of the routing bridges 1 to 3, the routing bridges 1 to 3 determine the routing bridges 1 to 3 as the edge routing bridges and the coupled server and virtual machine.

The link information communicating unit 310 of the routing bridges 1 to 6 broadcasts the link information having the link ID, the IDs of the routing bridge at both edges of the link, and the link cost, which is previously stored in the memory 301, into another routing bridge through the input/output interface 303. The link information communicating unit 310 obtains the link information having the ID, the IDs of the routing bridge at both edges of the link, and the link cost, which is broadcasted from the other routing bridge, through the input/output interface 303 and then stores the obtained link information in the memory 301. By the above-described processing of the link information communicating unit 310, the respective routing bridges 1 to 6 obtain the link information having the link ID of the link, which is not coupled to the routing bridges 1 to 6, the IDs of the routing bridge RB at both edges of the link, and the link cost. If the link IDs are redundant, the link ID may be uniquely determined by an adjustment by a representative routing bridge being determined from among the routing bridges 1 to 6.

The link information communicating unit 310 of the edge routing bridges 1 to 3 broadcasts the fact that routing bridges 1 to 3 are the edge routing bridge and the information related to the coupled server and virtual machine to another routing bridge through the input/output interface 303. By obtaining the information concerning the edge routing bridge, which is broadcasted from the other routing bridge, through the input/output interface 303, the link information communicating unit 310 determines the edge routing bridge in the network 1000.

For example, the routing bridge 4 illustrated in FIG. 2 is coupled to the routing bridge 1, and the link ID of the link corresponding to the coupling of the routing bridge 1 and the routing bridge 4 as the edges thereof is LK1. The routing bridge 4 is coupled to the routing bridge 2 through a link LK4. The routing bridge 4 is coupled to the routing bridge 3 through a link LK7. Since the routing bridge 4 is previously coupled to the link LK1, the link LK4, and the link LK7, the IDs of the routing bridge at both edges of the link, and the link cost regarding the link LK1, the link LK4, and the link LK7 are previously stored in the memory 301. The routing bridge 4 broadcasts the link ID of the link LK1, the link LK4, and the link LK7, the IDs of the routing bridge at both edges of the link, and the link cost to the routing bridges 1 to 3. Due to this, the routing bridge 1 obtains and stores the link ID of the link LK1, the link LK4, and the link LK7 and the IDs of the routing bridge at both edges of the link and the link cost in the memory 301 of the routing bridge 1. The link cost may be previously stored in the routing bridges 1 to 6 and set by the external unit of the routing bridges 1 to 6.

The routing bridges 1 to 6 specify the data to be transferred through each of the routing bridges 1 to 6 by combination (combination of a MAC address of a transmission source virtual machine and the MAC address of a destination virtual machine) of the virtual machines included in a configuration of the data to be transferred as a flow of the data and then store the specified flow as forwarding information in the memory 301 in association with the path to which the flow is assigned.

Based on the link ID, the IDs of the routing bridge at both edges of the link and the link cost, the link ID obtained from the other routing bridge and stored in the memory 301, the IDs of the routing bridge at both edges of the link, and the link cost stored in the memory 301, the cost information generating unit 311 of the routing bridges 1 to 6 generates association of the link ID of the link included in the routing bridge of both edges of the link, the IDs of the routing bridge at both edges of the link, and the link cost and then stores the association as part of the cost information in the memory 301. Based on the IDs of the routing bridge at both edges of the link, and the information related to the server and virtual machine coupled to the edge routing bridge and whether the routing bridge is coupled to the edge routing bridge, the cost information generating unit 311 of the routing bridges 1 to 6 generates association of the path IDs and the total link costs included in the network 1000 and then stores the association as part of the cost information in the memory 301. By the processing performed by the cost information generating unit 311, the cost information may include at least the information illustrated in FIGS. 5 and 6.

FIG. 5 illustrates part of cost information of the network according to the embodiments. The links LK1 to LK9 as the link ID that identifies the link between the routing bridges are associated with the association of the ID that identifies the routing bridge at both edges of the link. For example, the LK1 as an ID is assigned to the link having the routing bridge 1 and the routing bridge 4 as the edges thereof.

The link cost that is set in association with the link ID is a parameter value indicating a logical distance of the link. It is determined that the data transfer is efficient if the logical distance of the link is short. For example, it is determined that the link of which the value of the link cost is smaller than the value of the link cost which is set to another link is efficient for the data transfer, so that this link is selected to be the link for the data transfer. FIG. 5 illustrates an example of the combination of a case where the link costs of the link LK1 to LK9 are 100 where the bands of the links LK1 to LK9 are 10 Gbps, respectively. As described above, when the link cost is determined, the same link cost may be set if the bands of the target links are the same. If the bands of the target links are different from each other, the same link cost may be set to the target link if the link is desired to be selected at the same ratio. The embodiments are not limited when the bands of the links LK1 to LK9 are 10 Gbps, respectively.

In FIG. 6, path IDs P1 to P9 that identify a path between the edge routing bridges indicating another part of the cost information of the network according to the embodiments are associated with the link IDs of all the links included in the path. For example, the P1 as the path ID is assigned to the path that includes the link LK1 and the link LK4. With reference to FIG. 5, the link cost that is set to the link LK1 is 100, and the link cost that is set to the link LK4 is 100. Accordingly, the total value of the link costs of all the links included in the path P1 is 200, and the total link cost of the path P1 is set to 200.

The total link cost that is set in association with the path ID illustrated in FIG. 6 is a parameter value indicating a logical distance of the path. It is determined that the data transfer is efficient if the logical distance of the path is short. For example, in the combinations of the total link costs that are set in association with the path IDs, the path of which the value of the total link cost is smaller than the value of the total link cost of another path is determined to be efficient for the data transfer and is then selected as a path in which the data is transferred. FIG. 6 illustrates combinations of nine total link costs corresponding to the paths P1 to P9 and an example of the same total cost of the paths P1 to P9. If there is more than one path to which the smallest total link cost is set, the paths are selected at the same ratio. For example, the Round-robin may be applied to select the path that is least frequently selected.

Although FIGS. 5 and 6 illustrate the cost information regarding the part of the selectable path with the edge routing bridges 1 to 3 as both edge thereof, the embodiments are not limited to this example. The cost information regarding another selectable path in the network 1000 may be generated. While the routing bridges 1 to 6 do not generate the cost information, the cost information generating unit 311 of the routing bridge as the representative routing bridge among the routing bridges 1 to 6 obtains the link information from another routing bridge to generate the cost information and then broadcasts the cost information to the other routing bridge.

Figure 7:
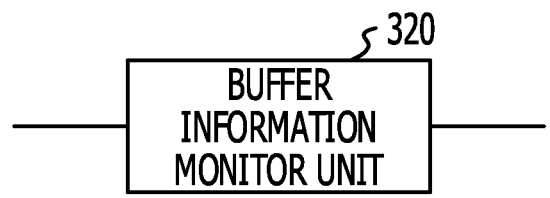
FIG. 7 illustrates another function block performed by the routing bridge (the relay device) according to the embodiments.

FIG. 7 illustrates another function block that is executed by the routing bridge (the relay device) according to the embodiments. When the CPU 300 executes the processing written in the program stored in the memory 301, the respective routing bridges 1 to 6 function as a buffer information monitor unit 320. The buffer information monitor unit 320 monitors an amount of data to be stored in an input buffer or an output buffer included in the input/output interface 303 illustrated in FIG. 3 or a capacity of the input buffer or the output buffer and then reports the monitor result as buffer information to the server 100 illustrated in FIG. 2.

Figure 8A:
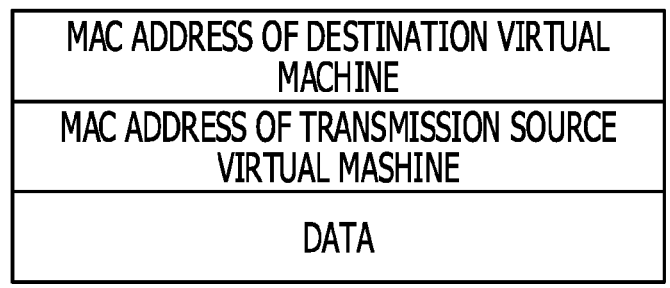
FIGS. 8A and 8B illustrate examples of a configuration of data that is transferred by the network according to the embodiments.
Figure 8B:
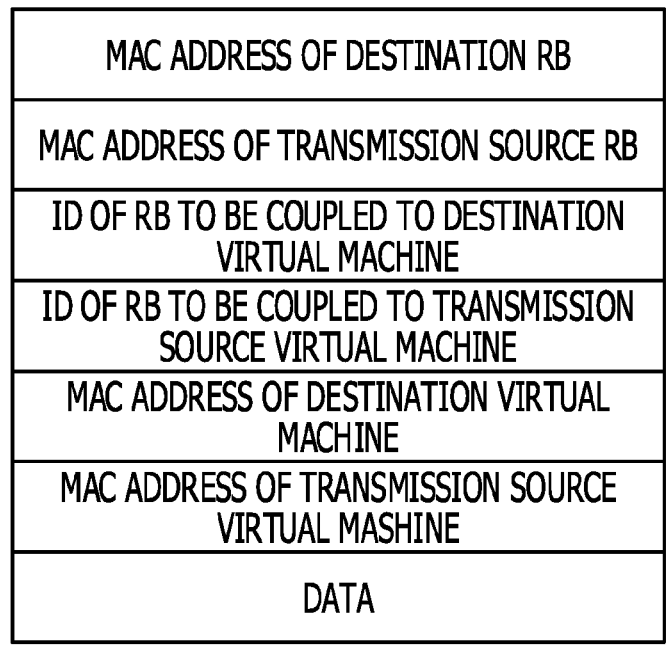

FIGS. 8A and 8B illustrate examples of a configuration of data to be transferred in the network according to the embodiments. FIG. 8A illustrates an example of the configuration of data to be transferred in the network according to the embodiments. FIG. 8B illustrates another example of the configuration of data to be transferred in the network according to the embodiments. As illustrated in FIG. 8A, when transmitting the data, the servers 101 to 104 transmit the data that includes at least data, a Media Access Control Address (MAC) address of the transmission source virtual machine, and the MAC address of the destination virtual machine. When receiving the data illustrated in FIG. 8A, based on the MAC address of the transmission source virtual machine and the MAC address of the destination virtual machine, the routing bridges 1 to 6 specify the edge routing bridge coupled to the destination virtual machine according to the cost information stored in the memory 301. When the edge routing bridge coupled to the destination virtual machine is specified, the ID of the routing bridge coupled to the transmission source virtual machine and the ID of the routing bridge coupled to the destination virtual machine are added to the data illustrated in FIG. 8A. When the path for data transfer is selected by the processing described below, the MAC address of the routing bridge as the MAC address of the transmission source routing bridge and the MAC address of the routing bridge as the following destination of the path for data transfer as the MAC address of the destination routing bridge are added to the data illustrated in FIG. 8A. By the above-described processing, the routing bridges 1 to 6 encapsulate the received data as the data illustrated in FIG. 8B and then transfer the data to the routing bridge as the following destination. The data transfer between the routing bridges is performed according to the path selection for the data transfer described below while the MAC address of the transmission source routing bridge and the MAC address of the destination routing bridge illustrated in FIG. 8B are being rewritten. When the routing bridge coupled to the destination virtual machine receives the data, the transfer destination as the following destination is the destination virtual machine. Thus, the encapsulated data illustrated in FIG. 8B is released, converted into the data configuration illustrated in FIG. 8A, and transferred to the destination virtual machine. When the servers 100 to 104 and the routing bridges 1 to 6 do not previously store the MAC address of the destination, Address Resolution Protocol (ARP) may be used to obtain the MAC address of the destination.

Figure 9:
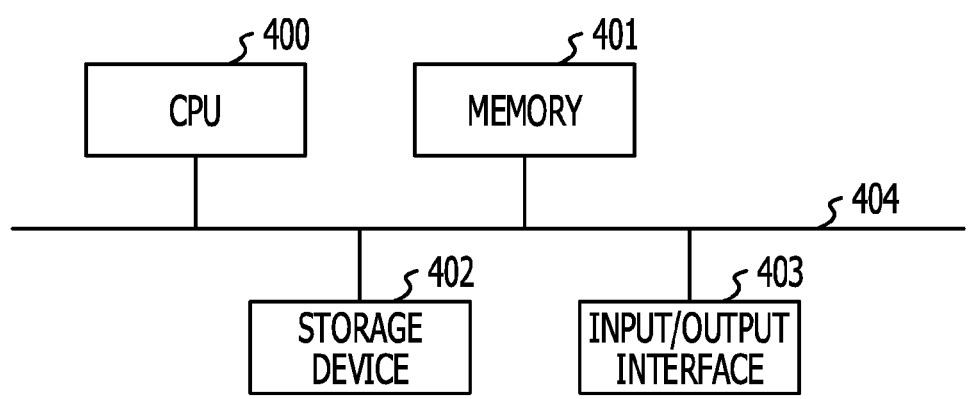
FIG. 9 illustrates a hardware configuration of the server included in the information processing system according to the embodiments.

FIG. 9 illustrates a hardware configuration of each of the servers 101 to 104 included in the information processing system according to the embodiments. Each of the servers 101 to 104 is a computer that includes a CPU 400, a memory 401, a storage device 402, an input/output interface 403, and a bus 404. The CPU 400, the memory 401, the storage device 402, and the input/output interface 403 are coupled to the bus 404. The CPU 400 may include more than one processor to process the processing. The memory 401 is a RAM, for example. The storage device 402 is, for example, a non-volatile memory such as a ROM and a flash memory or a magnetic disk device such as a Hard Disk Drive (HDD). The input/output interface 403 inputs and outputs data to and from an external device.

The memory 401 stores the program in which the processing for controlling the operations of the servers 101 to 104 is written. When the CPU 400 executes the program stored in the memory 401, the operations of the servers 101 to 104 are controlled, and the servers 101 to 104 function as the function blocks illustrated in FIG. 9.

Figure 10:
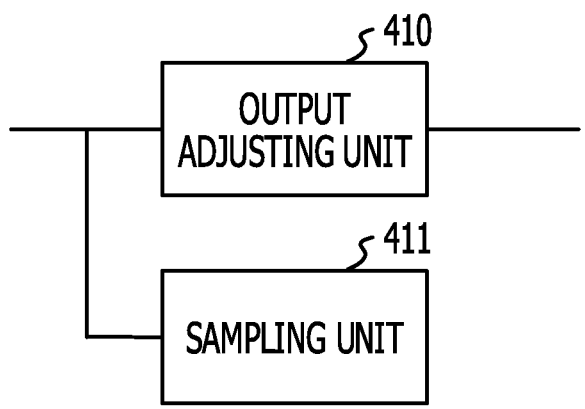
FIG. 10 illustrates function blocks performed by the server according to the embodiments.

FIG. 10 illustrates functions blocks that are executed by the servers 101 to 104. The servers 101 to 104 illustrated in FIG. 2 function as an output adjusting unit 410 and a sampling unit 411 when the CPU 400 performs the processing written in the program stored in the memory 401. The output adjusting unit 410 and the sampling unit 411 are, for example, functions included in the virtual switches 21 to 24 illustrated in FIG. 2.

The output adjusting unit 410 adjusts a plurality of transmission data blocks. The adjusted data is transferred to the routing bridge (the relay device) as the destination through the input/output interface 403. For example, the output adjusting unit 410 of the virtual switch 21 illustrated in FIG. 2 adjusts the data that is transferred from the virtual machines 11 to 13 and then transfers the data to the routing bridge 1 through the input/output interface 403.

The sampling unit 411 samples the data transferred from the plurality of virtual machines and then transfers the data as sampling information to the server 100 illustrated in FIG. 2 through the input/output interface 403. The sampling information includes at least the MAC address of the transmission source virtual machine, the MAC address of the destination virtual machine, an Internet Protocol Address (IP) address of the transmission source virtual machine, and the IP address of the destination virtual machine, and the data to be transmitted. The sampling information further includes at least the MAC address of the routing bridge RB as the destination or the MAC address of the routing bridge as the transmission source. For example, the sampling unit 411 of the virtual switch 21 illustrated in FIG. 2 samples the data transferred from the virtual machines 11 to 13 and then transfers the data as the sampling information to the server 100 through the input/output interface 403.

Figure 11:
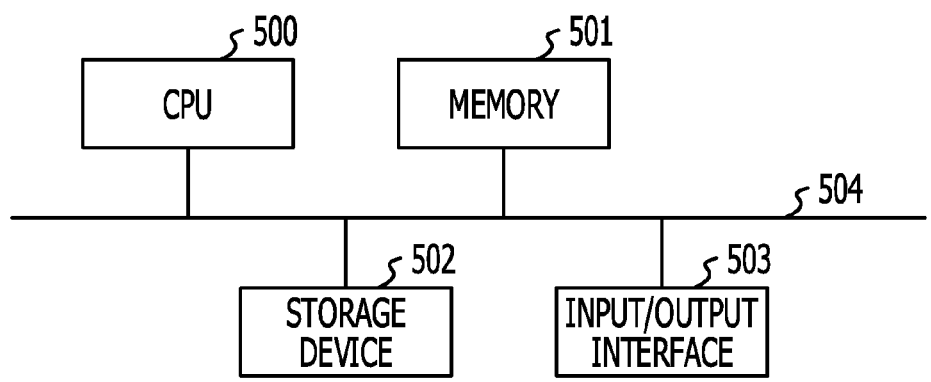
FIG. 11 illustrates a hardware configuration of a management server included in the information processing system according to the embodiments.

FIG. 11 illustrates a hardware configuration of the management server 100 included in the information processing system according to the embodiments. The server 100 is a computer that includes a CPU 500, a memory 501, a storage device 502, an input/output interface 503, and a bus 504. The CPU 500, the memory 501, the storage device 502, and the input/output interface 503 are coupled to the bus 504. The CPU 500 may include more than one processor to process the processing. The memory 501 is, for example, a RAM. The storage device 502 is, for example, a non-volatile memory such as a ROM and a flash memory or a magnetic disk device such as a HDD. The input/output interface 503 inputs and outputs data to and from an external device.

Figure 12:
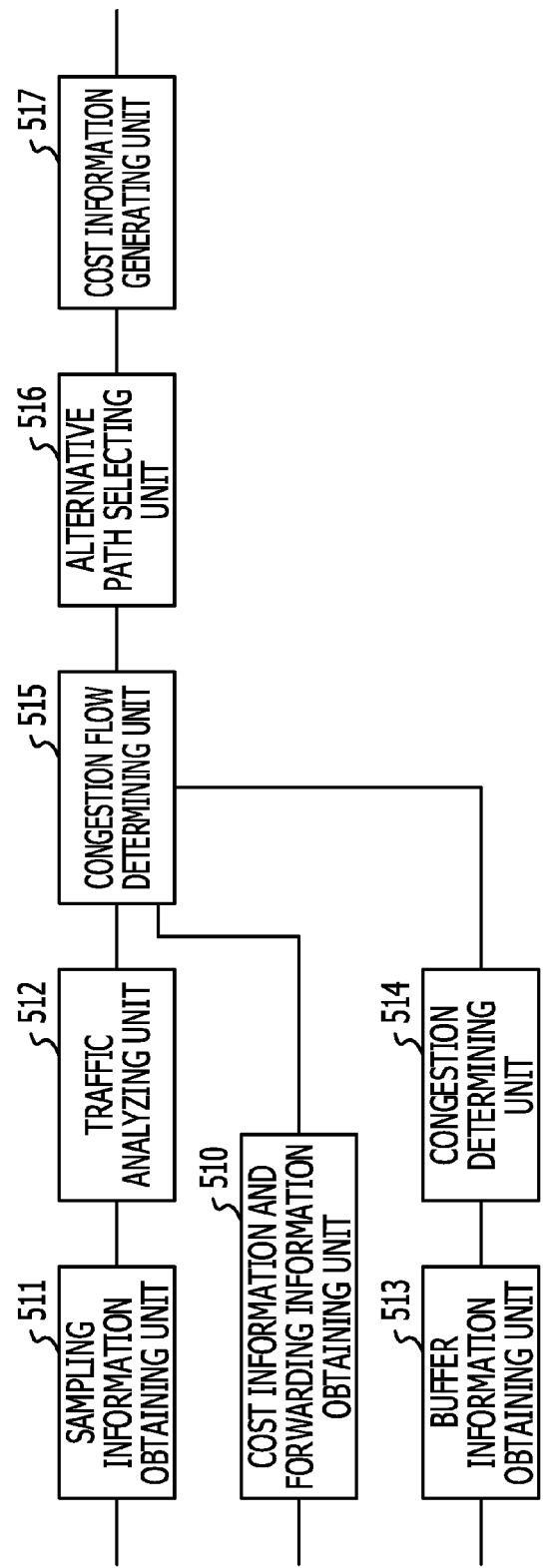
FIG. 12 illustrates function blocks performed by the management server according to the embodiments.
Figure 13:
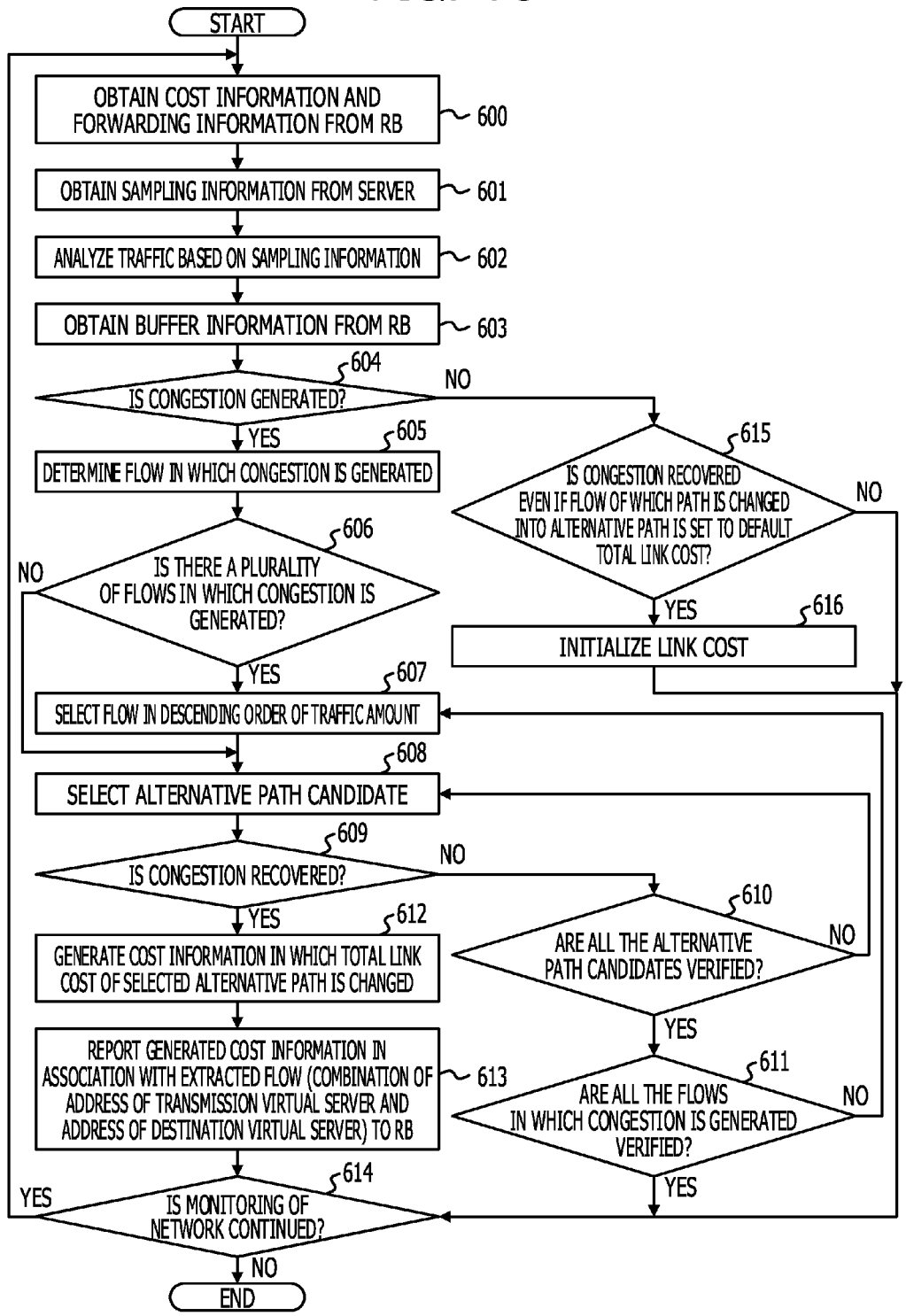
FIG. 13 illustrates processing performed by the management server according to the embodiments.

The memory 501 stores the program in which the processing for controlling the operation of the server 100 is written and the program in which the processing illustrated in FIG. 13 is written. When the CPU 500 executes the program stored in the memory 501, the operation of the server 100 is controlled, and the server 100 functions as the function blocks illustrated in FIG. 12.

FIG. 12 illustrates function blocks performed by the management server 100 according to the embodiments. When the CPU 500 executes the processing written in the program stored in the memory 501, the server 100 functions as a cost information and forwarding information obtaining unit 510, a sampling information obtaining unit 511, a traffic analyzing unit 512, a buffer information obtaining unit 513, a congestion determining unit 514, a congestion flow determining unit 515, an alternative path selecting unit 516, and a cost information generating unit 517. The processing performed by the function blocks will be described below in association with the procession illustrated in FIG. 13.

FIG. 13 illustrates processing that is performed by the management server 100 according to the embodiments. When the CPU 500 performs the processing written in the program stored in the memory 501, the server 100 performs the processing illustrated in FIG. 13.

The cost information and forwarding information obtaining unit 510 performs a processing 600 for obtaining the cost information and forwarding information generated by the routing bridges 1 to 6. According to the processing 600, the server 100 obtains and stores, in the memory 501, the cost information and forwarding information having the information illustrated in FIGS. 5 and 6.

The sampling information obtaining unit 511 performs a processing 601 for obtaining the sampling information from the servers 101 to 104. According to the processing 601, the server 100 obtains and stores the sampling information of the servers 101 to 104 in the memory 501. Based on the obtained sampling information, the traffic analyzing unit 512 performs a processing 602 for analyzing a traffic amount (a flow amount) of the data for each combination of a transmission source virtual machine and a destination virtual machine. Based on the MAC address of the transmission source virtual machine and the MAC address of the destination virtual machine included in the sampling information, the traffic analyzing unit 512 specifies a combination of the transmission source virtual machine and the destination virtual machine. By analyzing the data amount per time unit for each of the specified combinations, the traffic amount of data for the specified combination is obtained. According to the processing 602, the server 100 obtains the traffic amount of data for each combination of the transmission source virtual machine and the destination virtual machine and then stores the traffic amount in the memory 501. A flow ID is assigned to identify the traffic amount of data for each combination of the transmission source virtual machine and the destination virtual machine. For example, the flow ID is associated with a combination of the MAC address of the transmission source virtual machine and the MAC address of the destination virtual machine.

The buffer information obtaining unit 513 performs a processing 603 for obtaining buffer information that is monitored by the routing bridges 1 to 6. According to the processing 603, the server 100 obtains and stores, in the memory 501, the data amount stored in the input buffer or the output buffer of the routing bridges 1 to 6 or the information related to the capacity of the input buffer or the output buffer.

The congestion determining unit 514 performs a processing 604 for determining whether congestion is generated in the network 1000. Based on the obtained buffer information, the congestion determining unit 514 determines whether the data amount stored in the input buffer or the output buffer of the routing bridges 1 to 6 is larger than a given amount or whether congestion is generated in the network 1000 by determining whether the capacity of the input buffer or the output buffer is smaller than the given amount. For example, when detecting that the data amount of the input buffer of the routing bridge 3 that stores the data from the routing bridge 5 is larger than the given amount based on the buffer information obtained from the routing bridge 3, the congestion determining unit 514 determines that the congestion is generated in the link LK8 that couples the routing bridge 3 and the routing bridge 5. According to the processing 604, the server 100 determines whether the congestion is generated in any link included in the network 1000.

According to the processing 604, if it is determined that the congestion is generated in the network 1000, the congestion flow determining unit 515 performs a processing 605 for determining a flow in which the congestion is generated. As described above, the flow ID is assigned to identify the data transfer of each combination of the transmission source virtual machine and the destination virtual machine. For example, the flow ID is associated with a combination of the MAC address of the transmission source virtual machine and the MAC address of the destination virtual machine.

According to the processing 605, based on the cost information obtained by the cost information and forwarding information obtaining unit 510, the sampling information obtained by the sampling information obtaining unit 511, and the traffic amount of data of each combination of the transmission source virtual machine and the destination virtual machine obtained by the sampling information obtaining unit 511, the congestion flow determining unit 515 generates traffic information of the network 1000. The congestion flow determining unit 515 may generate the traffic information before the congestion determining unit 514 performs the processing 604 and detects that the congestion is generated in the network 1000. Since the traffic information generated by the congestion flow determining unit 515 uses the memory 501, usage efficiency of the memory 501 is increased when the traffic information used to specify the flow in which the congestion is generated is generated at a trigger where the congestion determining unit 514 determines that the congestion is generated in the network 1000.

FIG. 14 illustrates traffic information in a case where no congestion exists in the network according to the embodiments. For example, the traffic information is generated by the congestion flow determining unit 515 before the congestion determining unit 514 detects that the congestion is generated in the network 1000 and is then stored in the memory 501. The traffic information includes a flow ID, a combination of virtual machines, a traffic amount, an edge routing bridge (INGRESS/EGRESS) corresponding to the combination of virtual machines, a path ID, and an association of links included in a path.

The congestion flow determining unit 515 associates the information of the MAC address of the routing bridge as the destination and the MAC address of the routing bridge as the transmission source included in the sampling information obtained by the sampling information obtaining unit 511 with the information of the routing bridge at both edges of the link included in the cost information obtained by the cost information and forwarding information obtaining unit 510. Further, by associating the MAC address of the transmission source virtual machine and the MAC address of the destination virtual machine included in the sampling information obtained by the sampling information obtaining unit 511 with the MAC address of the transmission source virtual machine and the MAC address of the destination virtual machine included in the forwarding information, the congestion flow determining unit 515 specifies the coupling of links by determining the routing bridge to be relayed. Accordingly, the association of other information included in the cost information and the sampling information is specified, and the link ID, the path ID, the combination of edge routing bridges (INGRESS/EGRESS), and the combination of virtual machines are specified.

By associating the MAC address of the transmission source virtual machine and the MAC address of the destination virtual machine included in the sampling information obtained by the sampling information obtaining unit 511 with the traffic amount of data of each combination of the transmission source virtual machine and the destination virtual machine obtained by the traffic analyzing unit 512, the congestion flow determining unit 515 further specifies the combination of the link ID, the path ID, and the edge routing bridge, the combination of virtual machines, and the association of the traffic amount. Further, the congestion flow determining unit 515 uniquely determines the flow ID corresponding to the combination of the virtual machines.

The memory 501 stores the traffic information illustrated in FIG. 14 and the cost information illustrated in FIGS. 5 and 6, and the server 100 obtains the transfer state of the data in the network 1000 for each flow that is assigned for each combination of the virtual machines.

According to the embodiments, the combination of the transmission source virtual machine 11 and the destination virtual machine 15 uses the path P2 to perform the data transfer with the traffic amount of 4 Gbps, and F1 is assigned as a flow ID for the data transfer. The flow F1 will be described in detail below. The transmission source virtual machine 11 transfers the data with 4 Gbps to the routing bridge 1 included in the network 1000. The routing bridge 1 sets the routing bridge 1 to INGRESS and the routing bridge 3 to EGRESS, and transfers the data to the routing bridge 4 through the LK1 included in the path P2. The routing bridge 4 transfers the data to the routing bridge 3, which is set to EGRESS, through the link LK7 included in the path P2. The routing bridge 3 transfers the data to the virtual machine 15 as the destination virtual machine.

According to the embodiments, the combination of the transmission source virtual machine 12 and the destination virtual machine 16 uses the path P4 to perform the data transfer with the traffic amount of 7 Gbps, and F2 is assigned as a flow ID to the data transfer. The flow F2 will be described in detail below. The transmission source virtual machine 12 transfers the data with 7 Gbps to the routing bridge 1 included in the network 1000. The routing bridge 1 sets the routing bridge 1 to INGRESS and the routing bridge 3 to EGRESS and transfers the data to the routing bridge 5 through the link LK2 included in the path P4. The routing bridge 5 transfers the data to the routing bridge 3, which is set to EGRESS, through the link LK8 included in the path P4. The routing bridge 3 transfers the data to a virtual machine 18 as the destination virtual machine.

According to the embodiments, the combination of the transmission source virtual machine 13 and the destination virtual machine 17 uses the path P6 to perform the data transfer with the traffic amount of 2 Gbps, and F3 is assigned as a flow ID to the data transfer. The flow F3 will be described in detail below. The transmission source virtual machine 13 transfers the data with 2 Gbps to the routing bridge 1 included in the network 1000. The routing bridge 1 sets the routing bridge 1 to INGRESS and the routing bridge 3 to EGRESS and transfers the data to the routing bridge 6 through the link LK3 included in the path P6. The routing bridge 6 transfers the data to the routing bridge 3, which is set to EGRESS, through the link LK9 included in the path P6. The routing bridge 3 transfers the data to the virtual machine 17 as the destination virtual machine.

According to the embodiments, the combination of the transmission source virtual machine 14 and the destination virtual machine 18 uses the path P8 to perform the data transfer with the traffic amount of 2 Gbps, and F4 is assigned as a flow ID to the data transfer. The flow F4 will be described in detail below. The transmission source virtual machine 14 transfers the data with 2 Gbps to the routing bridge 2 included in the network 1000. The routing bridge 2 sets the routing bridge 2 to INGRESS and the routing bridge 3 to EGRESS and transfers the data to the routing bridge 5 through the link LK5 included in the path P8. The routing bridge 5 transfers the data to the routing bridge 3, which is set to EGRESS, through the link LK8 included in the path P8. The routing bridge 3 transfers the data to the virtual machine 18 as the destination virtual machine.

FIG. 15 illustrates the traffic information in a case where congestion exists in the network according to the embodiments. The traffic information illustrated in FIG. 15 is generated by the congestion flow determining unit 515 after the congestion determining unit 514 detects that the congestion is generated in the network 1000. The traffic information is then stored in the memory 501. Compared to FIG. 14 where the traffic amount of the flow F4 is 2 Gbps, the traffic amount of the flow F4 is 9 Gbps in FIG. 15. The processing by the congestion flow determining unit 515 for generating the traffic information as illustrated in FIG. 15 is equivalent to the illustration of FIG. 14.

FIG. 16 illustrates a congestion state of the network according to the embodiments. FIG. 16 illustrates association of a link ID, a flow ID, and a traffic amount of a link. The information illustrated in FIG. 16 is generated when the congestion flow determining unit 515 performs the processing 605 based on the association illustrated in FIG. 15. With reference to FIG. 15, based on the flow F2 with the traffic amount of 7 Gbps and the flow F4 with the traffic amount of 9 Gbps, it is determined that the congestion is generated in the link LK8 with a band of 10 Gbps. By the processing 605, the server determines a flow in which congestion is generated. In the above-described example, it is determined that the congestion is generated in the flow F2 and the flow F4.

The congestion flow determining unit 515 performs a processing 606 for determining whether there is a plurality of flows in which congestion is generated. If there is not a plurality of flows in which the congestion is generated, the process goes to a processing 608 described below. If there is more than one flow in which the congestion is generated, the congestion flow determining unit 515 performs a processing 607 for selecting flows in descending order of traffic account.

If the network 1000 illustrated in FIG. 2 is in the congestion state illustrated in FIG. 16, the flow in which the congestion is generated is the flow F2 and the flow F4. Thus, the congestion flow determining unit 515 performs the processing 607. In this case, with reference to FIG. 15, since the traffic amount of 9 Gbps of the flow F4 is larger than the traffic amount of 7 Gbps of the flow F2, the flow F4 is selected by the processing 607.

The alternative path selecting unit 516 performs the processing 608 for selecting an alternative path candidate. In the above-described example, an alternative path candidate of the flow F4 that uses the path P8 to perform the data transfer is selected. Based on the traffic information, the alternative path selecting unit 516 determines that the routing bridge 2 and the routing bridge 3 as an edge routing bridge are selected to perform the data transfer between the virtual machine 14 and the virtual machine 18. Based on the cost information stored in the memory 501, the alternative path selecting unit 516 determines that the path P7 that includes the link LK4 and the link LK7 or the path P9 that includes the LK6 and the link LK9 are selectable as another alternative path candidate between the routing bridge 2 and the routing bridge 3. In this case, the path P7 that includes the LK4 and the link LK7 is selected first.

The alternative path selecting unit 516 performs a processing 609 for determining whether the congestion is recovered by the selected alternative path candidate. The alternative path selecting unit 516 extracts the flow F1 that uses the link LK7 included in the selected path P7. The alternative path selecting unit 516 calculates the total value of the traffic amount of 4 Gbps of the flow F1 and the traffic amount of 9 Gbps of the flow F4. Since the calculated total value is larger than the band 10 Gbps of the link, the alternative path selecting unit 516 determines that the congestion is not recovered even if the path P7 is selected as the alternative path candidate of the flow F4. The process goes to a processing 610.

The alternative path selecting unit 516 performs the processing 610 for determining whether all the alternative path candidates are verified. In the above-described example, the path P9 that includes the link LK6 and the link LK9 are selectable as the alternative path candidate of the flow F4. Thus, the alternative path selecting unit 516 performs the processing 608 and then selects the path P9 as the alternative path candidate to perform the processing 609.

The alternative path selecting unit 516 extracts the flow F2 that uses the link LK6 included in the selected path P9.

The alternative path selecting unit 516 calculates the total value of the traffic amount of 7 Gbps of the flow F2 and the traffic amount of 9 Gbps of the flow F4. Since the calculated total value is larger than the band 10 Gbps of the link, the alternative path selecting unit 516 determines that the congestion is not recovered even if the path P9 is selected as the alternative path candidate of the flow F4. The process goes to the processing 610. In the processing 610, the alternative path selecting unit 516 verifies the path P7 and the path P9 as a selectable alternative path candidate. The process goes to a processing 611.

The alternative path selecting unit 516 performs the processing 611 for determining whether all the flows in which the congestion is generated are verified. Since the flow F2 is verified as the flow in which the congestion is generated, the alternative path selecting unit 516 determines that all the flows are not verified. The process goes to the processing 607. The congestion flow determining unit 515 extracts the flow F2 by the processing 607. The process goes to the processing 608.

Based on the traffic information stored in the memory 501, the alternative path selecting unit 516 determines that the routing bridge 1 and the routing bridge 3 are selected as an edge routing bridge so that the data transfer between the virtual machine 12 and the virtual machine 16 is performed. Based on the cost information stored in the memory 501, the alternative path selecting unit 516 determines that the path P2 that includes the link LK1 and the link LK7 or the path P6 that includes the link LK3 and the link LK9 are selectable as another alternative path candidate between the routing bridge 1 and the routing bridge 3. In this case, the path P2 that includes the link LK1 and the link LK7 is selected first.

The alternative path selecting unit 516 performs the processing 609 for determining whether the congestion is recovered by the selected alternative path candidate. The alternative path selecting unit 516 extracts the flow F1 that uses the link LK1 included in the selected path P2. The alternative path selecting unit 516 calculates the total value of the traffic amount of 4 Gbps of the flow F1 and the traffic amount of 7 Gbps of the flow F2. Since the calculated total value is larger than the band 10 Gbps of the link, the alternative path selecting unit 516 determines that the congestion is not recovered even if the path P2 is selected as the alternative path candidate of the flow F2. The process goes to the processing 610.

The alternative path selecting unit 516 performs the processing 610 for determining whether all the alternative path candidates are verified. In the above-described example, the path P6 that includes the link LK3 and the link LK9 is selectable as the alternative path candidate of the flow F2. Thus, the alternative path selecting unit 516 performs the processing 608 and then selects the path P6 as the alternative path candidate to perform the processing 609. The alternative path selecting unit 516 extracts the flow F3 that uses the link LK3 included in the selected path P6. The alternative path selecting unit 516 calculates the total value of the traffic amount of 2 Gbps of the flow F3 and the traffic amount of 7 Gbps of the flow F2. Since the calculated total value is not larger than the band 10 Gbps of the link, the alternative path selecting unit 516 determines that the congestion is recovered even if the path P6 is selected as the alternative path candidate of the flow F2. The process goes to a processing 612.

The cost information generating unit 517 performs the processing 612 for generating cost information obtained by changing the total link cost of the selected alternative path. The cost information generating unit 517 changes the link cost of the link LK3 and the link LK9 included in the alternative path P6 of the flow F2 that is determined to be changeable to recover the congestion into 50 from 100 that is set to be default and generates another piece of cost information that is used when the routing bridges 1 to 6 select the path of the flow F2. Regarding the change of the link cost, the link cost may be changed into 50 from 100 with respect to the link LK3, and the link cost may be changed into 50 from 100 with respect to the link LK9.

FIG. 17 illustrates the cost information that is changed in the network according to the embodiments. The changed cost information illustrated in FIG. 17 is generated when the cost information generating unit 517 performs the processing 612 and is then stored in the memory 501. Regarding the flow F2, since the link cost of the link LK3 and the link LK9 is changed into 50 from 100 that is defaulted and set, the total link cost of the path P5 that includes the link LK3 is 150, the total link cost of the path P6 that includes the link LK3 and the link LK9 is 100, and the total link cost of the path P9 that includes the link LK9 is 150.

The cost information generating unit 517 transmits and stores, in the memory 501, the cost information corresponding to the flow F2 illustrated in FIG. 17 in association with the combination (the combination of the MAC address of the transmission source virtual machine and the MAC address of the destination virtual machine) of virtual machines corresponding to the flow F2.

The routing bridges 1 to 6 determine the flow based on the MAC address of the transmission source virtual machine and the MAC address of the destination virtual machine included in the received data. If the determined flow is the flow F2, the routing bridges 1 to 6 use the updated cost information illustrated in FIG. 17 instead of the cost information illustrated in FIG. 6 to select the path for data transfer of the flow F2. The routing bridges 1 to 6 selects the path, which has the smallest total link cost among the combinations of the total link cost included in the cost information, as the path of data transfer. Thus, in the updated cost information illustrated in FIG. 17, the path P6 having the smallest total link cost is selected as the path of the flow F2. Therefore, the data transfer of the flow F2 is not performed through the link LK8, the congestion in the link LK8 caused by the flow F2 and the flow F4 is recovered. Even if the path P6 is selected as another path of the flow F2, the path P6 is used by the flow F2 with the traffic amount of 7 Gbps and the flow F3 with the traffic amount of 2 Gbps. Therefore, no new congestion is generated.

FIG. 18 illustrates the changed cost information. Regarding not only the flow F2, the cost information illustrated in FIG. 18 is obtained by changing the link cost of the link LK3 and the link LK9 into 50 from 100 that is defaulted and set. Thus, the cost information illustrated in FIG. 18 is a comparison example where the total link cost of the path P5 that includes the link LK3 is 150, and the total link cost of the path P6 that includes the link LK3 and the link LK9, and the total link cost of the path P9 that includes the link LK9 is 150. When the cost information illustrated in FIG. 18 is set to the routing bridges 1 to 6, no matter which flow the routing bridges 1 to 6 receive, the routing bridges 1 to 6 selects the path P6 according to the cost information illustrated in FIG. 18. In this case, not simply the flow F2 but also the flow F1 and the flow F3 use the path P6. With reference to FIG. 15, the total value of the traffic amount is 13 Gbps when the flows F1 to F3 are congested into the path P6. Since the total value of the traffic amount exceeds the band of the link, new congestion is generated. That is, if the total link cost is simply changed by a network with a design concept for selecting a path according to the total link cost even though the path of the flow is changed to recover the congestion, new congestion may be generated.

Here, since the congestion is generated in the link LK8, the link cost of the link LK8 is considered to be larger so that the flow F2 uses the link LK8 not to perform the data transfer. When the link cost of the link LK8 is changed into 200 from 100, the total link cost of the path P4 becomes 300. Therefore, when selecting the path corresponding to the flow F2, the routing bridge selects the path P2 or the path P6 of which the total link cost is set to 200 and does not select the path P4 of which the total link cost is set to 300. However, when the routing bridge selects the path of the flow F1 and the flow F3, path selection is performed where the total link cost of the path P4 is 300. That is, the routing bridge equally assigns the flow F1 with the traffic amount of 4 Gbps, the flow F2 with the traffic amount of 7 Gbps, and the flow F3 with the traffic amount of 2 Gbps to the path P2 and the path P6. Therefore, even if the flow that includes the link LK8 is prevented from being selected as the selection path of the flow F4, new congestion is generated if the flow F1 with the traffic amount of 4 Gbps competes with the flow F2 with the traffic amount of 7 Gbps in either the path P2 or the path P6.

To autonomously disperse the load of the network, in a network that is designed with a technique concept for selecting a path for data transfer according to the total link cost that is set as a parameter so that the paths are selected at the equal ratio when the total link costs there are equal to each other, a plurality of flows is congested into a path to which the smallest total link lost is set when the link cost and the total link cost are simply changed. Due to this, new congestion is generated.

According to the embodiments, the updated cost information that is applied to the flow in which the congestion is generated is generated separately from the default cost information. The cost information that is updated separately from the default cost information is used at time of selecting the path of the flow in which the congestion is generated, so that no new congestion is generated and the generated congestion is recovered. If it is determined that there is a plurality of selectable paths as an alternative path of the flow in which the congestion is generated, the smallest total link cost is set to each selectable alternative path separately from the default cost information. Therefore, the paths of the flows of which the paths are changed due to the congestion are autonomously dispersed according to the design concept of the network even after the paths of the flows are changed. The default cost information before the change is applied to the path selection for the data transfer of the flow that is not a target of the path change. Thus, the load of the network is dispersed as described above.

The processing illustrated in FIG. 13 will be described below. The server 100 performs a processing 614 for determining whether to continue monitoring the network after a processing 613. If the monitoring of the network is continued, the process goes to the processing 600. If the monitoring of the network is not continued, the process ends.

If the processing 604 determines that no congestion is generated, the process goes to a processing 615. The processing 615 is performed by the alternative path selecting unit 516 to determine whether the congestion is prevented even if the flow of which the path is changed into an alternative path is set to the default total link cost. According to the embodiments, even when the alternative path selecting unit 516 references the traffic amount of the flow F2 stored in the memory 501 and assigns the path other than the changed path P6 to the flow F2, if it is determined that the total value of the traffic amount of the flow F2 and the traffic amount of the other flow does not exceed the band of the link, the process goes to a processing 616. When the alternative path selecting unit 516 performs the processing 616, the total link cost of the updated cost information corresponding to the flow F2 is initialized. For example, the alternative path selecting unit 516 sends an instruction for deleting the cost information of the total link cost corresponding to the flow F2 to the routing bridges 1 to 6. When the total link cost of the updated cost information corresponding to the flow F2 is initialized, the routing edges 1 to 6 select the path of the flow according to the default cost information as with the other flows even when receiving the flow F2. If the processing 615 determines that the congestion is not recovered by the default total link cost, the process goes to the processing 614.

FIG. 19 illustrates other function blocks of the routing bridge (the relay device) according to the embodiments. When the CPU 300 performs the processing written in the program stored in the memory 301, the routing bridges 1 to 6 illustrated in FIG. 2 function as an address determining unit 312, a cost information selecting unit 313, a path selecting unit 314, a packet generating unit 315, an address setting unit 316, and a cost information setting unit 317. The processing performed by the function blocks will be described in association with the processing illustrated in FIG. 20.

FIG. 20 illustrates the processing performed by the routing bridge (the relay device) according to the embodiments. The routing bridges 1 to 6 illustrated in FIG. 2 perform the processing illustrated in FIG. 20 when the CPU 500 performs the processing written in the program stored in the memory 501.

The routing bridges 1 to 6 perform a processing 700 for determining whether received data is stored. If the received data is stored in the input buffer included in the input/output interface 303, the process goes a processing 701.

Based on address information included in the received data, the address determining unit 312 performs the processing 701 for determining the flow for data transfer. The address determining unit 312 determines the flow for data transfer by determining the combination of the virtual machines based on the MAC address assigned to the transmission source virtual machine and the MAC address assigned to the destination virtual machine included in the received data. For example, when the instruction for storing the updated cost information corresponding to the flow F2 is obtained from the server 100, the address determining unit 312 stores the information corresponding to the flow F2 in the memory 301 or a register. By comparing the combination of the virtual machines determined based on the received data to the information stored in the memory 301 or the register according to the instruction from the server 200, the address determining unit 312 may determine whether the received data is the flow F2. If the received data is the flow F2, the address determining unit 312 instructs the cost information selecting unit 313 to select the cost information corresponding to the flow F2. If the received data is not the flow F2, the address determining unit 312 instructs the cost information selecting unit 313 to select the default cost information.

The cost information selecting unit 313 performs a processing 702 for selecting the cost information corresponding to the determined flow from the memory 301. The cost information selecting unit 313 selects the cost information according to the instruction from the address determining unit 312. For example, when the address determining unit 312 sends the instruction to select the updated cost information corresponding to the flow F2, the cost information selecting unit 313 specifies the address of the updated cost information corresponding to the flow F2 to perform the reading operation on the memory 301. When the address determining unit 312 sends the instruction to select the default cost information, the cost information selecting unit 313 specifies the address of the default cost information to perform the reading operation on the memory 301.

The path selecting unit 314 performs a processing 703 for selecting a path of which the total link cost has a given value in the cost information read out from the memory 301. No congestion exists in the network 1000, and the cost information selecting unit 313 reads out the default cost information (see FIGS. 5 and 6) according to the processing 702. Based on the MAC address assigned to the transmission source virtual machine and the MAC address assigned to the destination virtual machine included in the received data, the path selecting unit 314 extracts a selectable path. According to the total link cost of the path that is determined to be selectable based on the cost information, the path selecting unit 314 selects the path of which the total link cost has the given value. The given value is, for example, the minimum value. The path of which the total link cost has the minimum value is selected. For example, when the data is transferred to the virtual machine 15 from the virtual machine 11 illustrated in FIG. 2, the received data is added with information of the MAC address assigned to the virtual machine 11 as the MAC address of the transmission source virtual machine and the MAC address assigned to the virtual machine 15 as the MAC address of the destination virtual machine. Therefore, based on the combination of the address information and the total cost information of the cost information (see FIGS. 5 and 6), the path P2, the path P4, and the path P6 are determined to be selectable as a path for data transfer of the flow F1. Since the total link cost of the path P2, the path P4, and the path P6 is 200, the path selecting unit 314 performs the processing 703 to select the path P2, the path P4, and the P6.

The path selecting unit 314 performs a processing 704 for determining whether there are paths having the same total link cost among the paths selected by the processing 703. In the above-described example, since the total link cost of the path P2, the path P4, and the path P6 is 200, the path selecting unit determines that there are paths having the same total link cost. The process goes to a processing 705.

The path selecting unit 314 performs the processing 705 for selecting the paths at the same ratio when there are paths having the same total cost. The path selecting unit 314 may apply, for example, the Round-robin to select the path that is least frequently selected among the path P2, the path P4, and the path P6 that have the same total cost.

The packet generating unit 315 performs a processing 706 for adding the ID of the routing bridge, which is coupled to the server in which the transmission source virtual machine performs, and the ID of the routing bridge, which is coupled to the server in which the destination virtual machine performs, to the data. The packet generating unit 315 performs a processing 707 for encapsulating and transmitting the data by the address of the routing bridge as the following destination and the address of the transmission source routing bridge among the paths selected by the processing 705. When the packet generating unit 315 performs the processing 706 and the processing 707, the data illustrated in FIG. 8A is encapsulated as illustrated in FIG. 8B and is then transferred to the following destination.

The routing bridges 1 to 6 perform a processing 708 for determining whether to continue a communication state. If the communication state is continued, the process goes to the processing 700. If the communication state is not continued, the process ends.

If the processing 700 determines that there is no received data, the routing bridges 1 to 6 perform a processing 709 for determining whether a notice of the updated cost information is sent from the server 100. The processing 709 may be performed regardless of existence of the received data. For example, the processing 709 may be periodically performed and performed before or after a specific event happens.

The processing 709 will be described below with an example of a case where the network 1000 illustrated in FIG. 2 is in a traffic state illustrated in FIG. 16, congestion is generated in the link LK8, and the server 100 sends a notice to store the total link cost corresponding to the flow F2 illustrated in FIG. 17 in the memory 301 of the routing bridges 1 to 6 to recover the congestion. If the notice of the updated cost information is not sent, the process goes to a processing 711.

If the processing 709 determines that the notice of the updated cost information is sent, the address setting unit 316 and the cost information setting unit 317 perform a processing 710 for storing the updated cost information in the memory 301 in association with the flow (the combination of the address of the transmission source virtual server and the address of the destination virtual server). When the server 100 instructs the address setting unit 316 to store the cost information that is updated with respect to the flow F2 in the memory 301, to specify the combination of the virtual machines corresponding to the flow F2 when the data is received, the address setting unit 316 sets the combination of the MAC address assigned to the transmission source virtual machine and the MAC address assigned to the destination virtual machine corresponding to the flow F2 to the memory 301 or the register of the address determining unit 312. When the server 100 instructs the cost information setting unit 317 to store the updated cost information corresponding to the flow F2 in the memory 301, the cost information setting unit 317 stores the updated cost information in the memory 301. As a result, the memory 301 of the routing bridges 1 to 6 stores both the updated cost information corresponding to the flow F2 and the default cost information.

The routing bridges 1 to 6 perform the processing 711 for determining whether an initialization instruction of the cost information stored in the memory 301 is sent from the server. The processing timing of the processing 711 is not typically desired after the processing 710. For example, the processing 711 may be periodically performed and performed before or after a specific event happens. If the memory 301 stores the updated cost information according to the instruction from the server 100, the capacity of the memory 301 is used. Therefore, if the processing 615 illustrated in FIG. 14 determines that the link cost may be initialized, the process goes to a processing 712. By deleting redundant cost information from the memory according to the initialization instruction from the server 100, the capacity of the memory 301 is efficiently used.

The processing 710 performed by the routing bridges 1 to 6 for selecting the path of the flow F2 when the memory 301 stores both the changed cost information corresponding to the flow F2 and the default cost information will be described below. For example, when the routing bridge 1 receives the flow F2 from the virtual machine 12, the address determining unit 312 of the routing bridge 1 performs the processing 701 to determine that the received data corresponds to the flow F2 by comparing the combination of the MAC address assigned to the transmission source virtual machine and the MAC address assigned to the destination virtual machine included in the received data with the address information stored in the memory 301 or the register. The address determining unit 312 instructs the cost information selecting unit 313 to read out the cost information (see FIG. 17) corresponding to the flow F2 stored in the memory 301. The path selecting unit 314 performs the processing 703 to select a path, of which the total link cost has the given value, based on the read-out cost information (FIG. 17). Here, the path having the minimum total link cost is selected. The path selecting unit 314 selects the path P6. When the path selecting unit 314 performs the processing 704, it is determined that there is no path having the same total link cost. The process goes to the processing 706. With respect to the received data, the packet generating unit 315 encapsulates the information corresponding to the path P6 and according to the processing 706 and the processing 707 so that the data configuration illustrated in FIG. 8B is obtained. The packet generating unit 315 transfers the encapsulated data to the routing bridge 6 as the following destination. By the selection of the transfer destination, the traffic state of the network 1000 is illustrated in FIGS. 21 and 22.

FIG. 21 illustrates another piece of traffic information obtained when no congestion exists in the network according to the embodiments. The traffic information illustrated in FIG. 21 is generated by the congestion flow determining unit 515 after the path for data transfer of the flow F2 is changed into the path P6. The traffic information is stored in the memory 501. The processing performed by the congestion flow determining unit 515 for generating the traffic information illustrated in FIG. 21 is equivalent to the description of FIG. 13.

FIG. 22 illustrates a traffic state of the network according to the embodiments. FIG. 22 illustrates association of link IDs, flow IDs, and traffic amounts of the links. The information illustrated in FIG. 22 is generated when the congestion flow determining unit 515 performs the processing 605 based on the association illustrated in FIG. 15. The path for data transfer of the flow F2 is changed into the path P6, so that no congestion is generated in the respective links.

As described above, the path for data transfer is selected according to the total link cost that is set as the parameter to disperse the load of the network. Further, when congestion is generated in the network having the relay device that is designed with the technique concept for selecting the paths at the same ratio when the total link costs are equal to each other, new congestion may be generated when a plurality of flows is congested into the path to which the changed total link cost is set simply if the link cost or the total link cost is changed. According to the embodiments, the cost information applied to a flow in which the congestion is generated, and the transfer path of the flow is selected when the updated cost information is applied to the flow separately from another flow at time of selecting the path of the flow. As a result, no new congestion is generated even when the path for data transfer of the flow is selected based on the total link cost according to the technique concept, and the generated congestion is recovered. In the above-described embodiments, the data transfer between the virtual serves is illustrated as an example. However, the embodiments are not limited to the example. The embodiments may apply to the data transfer between physical servers.

According to the above-described embodiments, when congestion is generated between relay devices, a plurality of data transfers is congested into a specific path, and new congestion is prevented.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An information processing system comprising:
  a plurality of computers configured to execute data communication with each other using a network, the plurality of computers including a first computer and a second computer, the network including a plurality of transfer paths among the plurality of computers; and
  a plurality of relay devices included in the network and coupled to each other via a plurality of links, each of the plurality of links having a link cost,
  wherein
  a plurality of first values of the link cost are allocated to the plurality of links, respectively,
  first amount values of the link costs are calculated for each of the plurality of paths by summing the first values of the links included in each of the plurality of transfer paths,
  first data communication between the first computer and the second computer is executed via a first transfer path selected from the plurality of transfer paths based on the first amount values of the link costs of each of the plurality of transfer paths,
  when a data traffic exceeds a certain amount in a first link included in the first transfer path, a plurality of second values of the link cost are allocated to the plurality of links, respectively, at least one of the second values of the link cost being different from the corresponding first value of the link cost for the respective link,
  second amount values of the link costs are calculated for each of the plurality of paths by summing the second values of the links included in each of the plurality of transfer paths, and
  the first data communication between the first computer and the second computer is executed via a second transfer path which does not include the first link and is selected from the plurality of transfer paths based on the second amount values of the link costs of each of the plurality of paths, while second data communication other than the first communication is executed via a third transfer path selected from the plurality of transfer paths based on the first amount values of the link costs of each of the plurality of paths.

2. The information processing system according to claim 1, the information processing system further comprising a management computer coupled to the network,
  wherein the management computer transmits, to the plurality of relay devices, the link cost of the second value and computer combination information indicating the first computer and the second computer.

3. The information processing system according to claim 2, wherein
a third computer and a fourth computer included in the plurality of computers execute data communication using the first link, and
the management computer transfers, to the plurality of relay devices, the computer combination information indicating the first computer and the second computer in association with the link cost of the second value when data traffic between the first computer and the second computer causes a traffic congestion.

4. The information processing system according to claim 2, wherein when the data traffic once exceeds the given value and then the data traffic becomes smaller than the given value, the link cost of the second value is deleted from the plurality of relay devices.

5. The information processing system according to claim 4, wherein after the link cost of the second value is deleted, the first data communication between the first computer and the second computer is executed via a transfer path which is selected from the plurality of transfer paths based on the first amount values of the link costs of each of the plurality of paths.

6. The information processing system according to claim 1, wherein according to the link cost of the second value, the first amount value of the link cost of the links included in the second transfer path is smaller than the second amount value of the link cost of the links included in other transfer paths of the plurality of transfer paths.

7. The information processing system according to claim 6, wherein
the plurality of transfer paths include a fourth path, the second amount value of the fourth path being equal to the second amount value of the second path, and
the plurality of relay devices select any one of the second path and the fourth path based on frequency of selection of the second path and the fourth path.

8. An information processing method using a plurality of computers and a plurality of relay devices, the plurality of computers executing data communication with each other using a network, the plurality of computers including a first computer and a second computer, the network including a plurality of transfer paths among the plurality of computers, the plurality of relay devices being included in the network and being coupled to each other via a plurality of links, each of the plurality of links having a link cost, the method comprising:
allocating a plurality of values of the link cost included in a first value set to the plurality of links, respectively;
calculating first amount values of the link costs for each of the plurality of paths by summing the first values of the links included in each of the plurality of transfer paths;
executing first data communication between the first computer and the second computer via a first transfer path selected from the plurality of transfer paths based on the first amount values of the link costs of each of the plurality of transfer paths;
when a data traffic exceeds a certain amount in a first link included in the first transfer path, allocating a plurality of second values of the link cost to the plurality of links, respectively, at least one of the second values of the link cost being different from the corresponding first value of the link cost for the respective link;
calculating second amount values of the link costs for each of the plurality of paths by summing the second values of the links included in each of the plurality of transfer paths;
executing the first data communication between the first computer and the second computer via a second transfer path which does not include the first link and is selected from the plurality of transfer paths based on the second amount values of the link costs of each of the plurality of paths; and
executing second data communication other than the first communication via a third transfer path selected from the plurality of transfer paths based on the first amount values of the link costs of each of the plurality of paths.

9. The information processing method according to claim 8, wherein a management computer is coupled to the network, and the method further comprises:
transmitting, from the management computer to the plurality of relay devices, the link cost of the second value and computer combination information indicating the first computer and the second computer.

10. The information processing method according to claim 9, further comprising:
executing, by a third computer and a fourth computer included in the plurality of computers, data communication using the first link; and
transmitting, from the management computer to the plurality of relay devices, the computer combination information indicating the first computer and the second computer in association with the link cost of the second value when data traffic between the first computer and the second computer causes a traffic congestion.

11. The information processing method according to claim 9, further comprising:
when the data traffic once exceeds the given value and then the data traffic becomes smaller than the given value, deleting the link cost of the second value from the plurality of relay devices.

12. The information processing method according to claim 11, further comprising:
after the link cost of the second value is deleted, selecting a transfer path from the plurality of transfer paths based on the first amount values of the link costs of each of the plurality of paths; and
executing the first data communication between the first computer and the second computer through the selected transfer path.

13. The information processing method according to claim 8, wherein according to the link cost of the second value, the first amount value of the link cost of the links included in the second transfer path is smaller than the second amount value of the link cost of the links included in other transfer paths of the plurality of transfer paths between the first computer and the second computer.

14. The information processing method according to claim 13, wherein the plurality of transfer paths includes a fourth path, the second amount value of the fourth path being equal to the second amount value of the second path, and the method further comprises:
selecting any one of the second path and the fourth path based on frequency of selection of the second path and the fourth path.

* * * * *